//www.patent.gov

United States Patent [19]
Fein et al.

[11] 3,991,385
[45] Nov. 9, 1976

[54] GAS LASER WITH SPUTTER-RESISTANT CATHODE

[75] Inventors: Michael E. Fein, Toledo; Charles W. Salisbury, Rising Sun, both of Ohio

[73] Assignee: Owens-Illinois, Inc., Toledo, Ohio

[22] Filed: Feb. 3, 1975

[21] Appl. No.: 546,240

[52] U.S. Cl. .................. 331/94.5 D; 331/94.5 G; 331/94.5 T
[51] Int. Cl.² ................... H01S 3/22; H01S 3/03
[58] Field of Search ............. 331/94.5 G, 94.5 PE, 331/94.5 D; 330/4.3

[56] References Cited
UNITED STATES PATENTS

| | | | |
|---|---|---|---|
| 3,394,320 | 7/1968 | Medicus | 331/94.5 D |
| 3,670,256 | 6/1972 | McMahan | 331/94.5 D |

*Primary Examiner*—Robert J. Webster
*Attorney, Agent, or Firm*—Donald Keith Wedding

[57] ABSTRACT

There is disclosed a gaseous laser, whose cathode is a conductive coating upon the walls of a cathode volume, the geometric design of the cathode, cathode volume, and cathode-connecting volume being such as to impede sputtering of the cathode.

8 Claims, 12 Drawing Figures

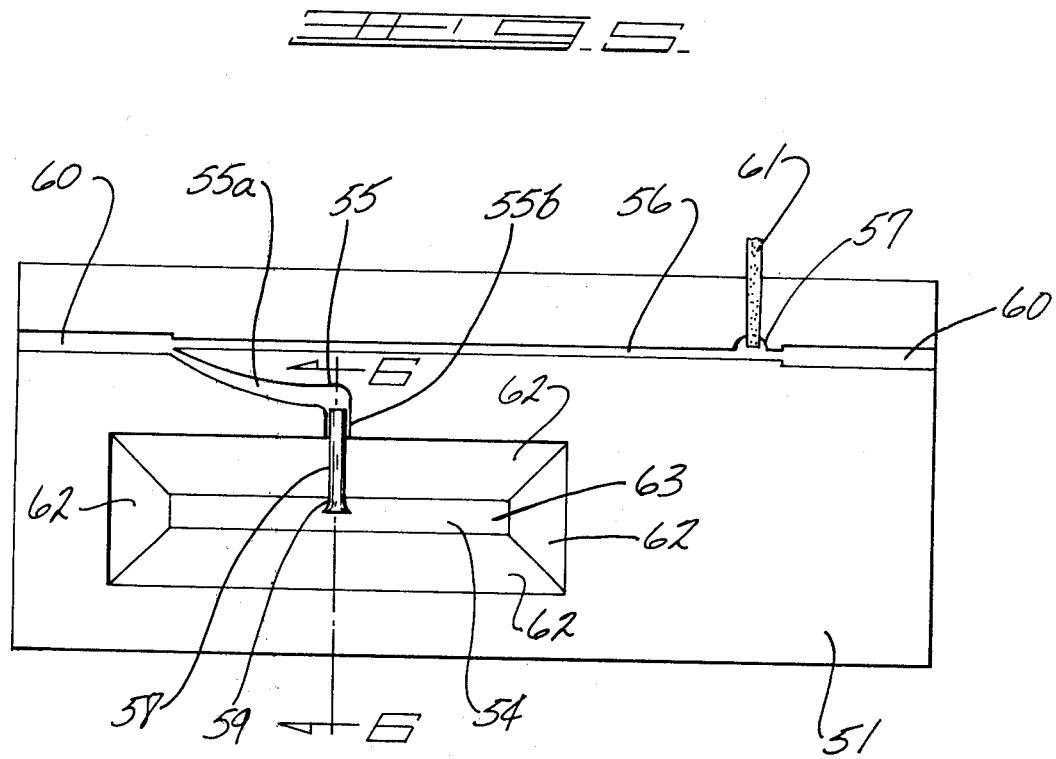
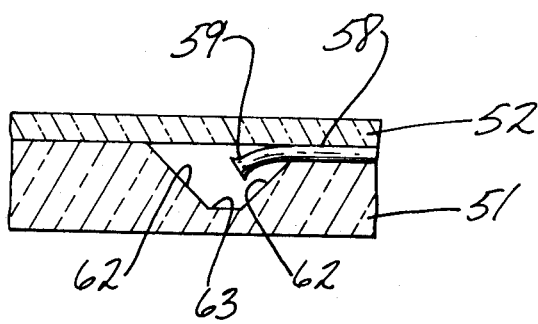

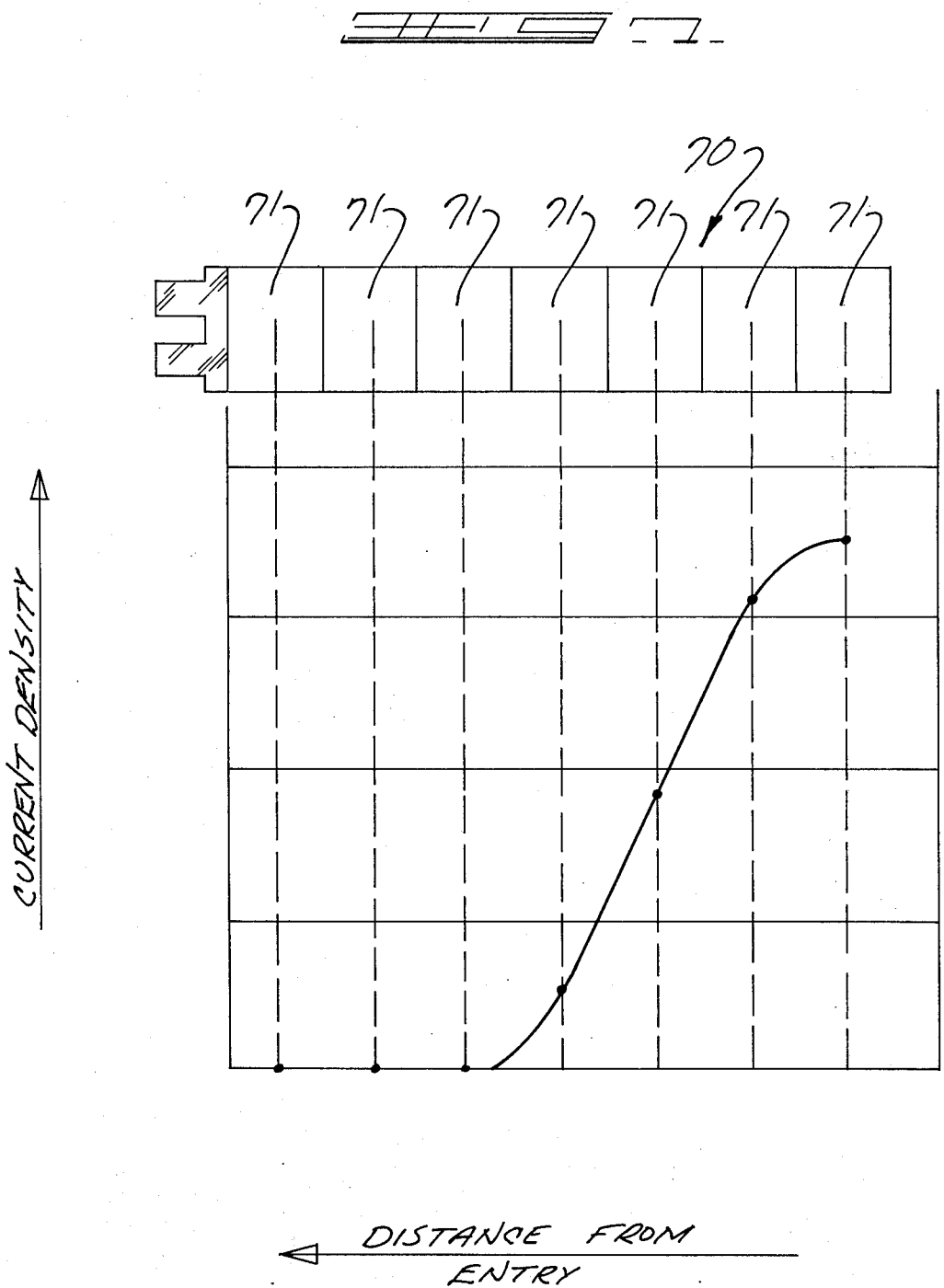

GAS LASER WITH SPUTTER-RESISTANT CATHODE

This invention relates to gas lasers. More particularly, it relates to special geometric configurations of gas lasers (especially laser envelopes) which are inexpensive to manufacture and assemble. This invention also relates to methods of manufacture, assembly, fabrication, and processing of such laser devices, including laser systems incorporating such devices.

Gas lasers are widely known in the prior art. Reference is made to U.S. Pat. No. 3,628,175, issued to J. D. Rigden and U.S. Pat. No. 3,149,290, issued to W. R. Bennett, Jr. and Ali Javan. See also Douglas C. Sinclair and W. Earl Bell, *Gas Laser Technology*, Holt, Rinehart and Wilson, c. 1969.

Typically, a gas laser comprises an elongated hollow body containing a suitable gas and two laser mirrors positioned at opposing ends of the body. Pump energy is appropriately introduced into the gas, causing a population inversion to exist therein. The existence of this inversion between laser mirrors of adequate reflectivity causes laser oscillation to develop in the gas. Alternatively, where the laser is used as an amplifier, the gas-filled body may simply be terminated by windows transparent to the wavelength to be amplified.

Many different sources of pump energy have been shown to be suitable for the initiation of laser action in gas lasers and are well known to those skilled in the art.

One important method of providing pump energy is to initiate an a.c. (alternating current) or d.c. (direct current) gas discharge in the laser gas. Another method is to illuminate the laser gas volume with electromagnetic radiation of a suitable wavelength, such as radio frequency waves, visible light, or gamma radiation. Yet another method is to initiate a suitable chemical reaction in the laser gas. Additional pumping methods are known to those skilled in the art. Most of the embodiments set forth in this disclosure will refer specifically to a gas laser embodiment in which a direct current electrical discharge is maintained in the laser gas. However, the component configurations and manufacturing methods described throughout this specification can be suitably used with a d.c. discharge in combination with any of a wide variety of pumping techniques such as radio-frequency pumping, and the use of such alternative techniques is contemplated in the practice of this invention.

A wide variety of gases may be used in gas laser construction. For example, successful gas lasers have been made with the gaseous forms of at least the following materials, separately or in mixture combination: helium, neon, argon, krypton, xenon, oxygen, mercury, cadmium, carbon dioxide, carbon monoxide, water, sodium, potassium, cesium, copper, gold, calcium, strontium, thallium, carbon, silicon, tin, lead, nitrogen, sulfur, tellurium, florine, chlorine, iodine, manganese, zinc, boron, indium, germanium, phosphorus, arsenic, antimony, bismuth, selenium, CN, HBr, DBr, HCl, DCl, HF, DF, HD, $D_2$, $H_2$, NO, $CS_2$, HCN, DCN, $D_2O$, $H_2S$, $N_2O$, OCS, $SO_2$, $CH_3F$, $CH_3OH$, $H_2C$:CHCl, and $NH_3$.

One preferred gas mixture for certain applications is helium — neon, the typical composition being about 75 to 95 percent atoms of helium and 25 to 5 percent atoms of neon. One specifically contemplated composition is 87.5% atoms of helium and 12.5% atoms of neon, at a pressure of about 3 Torr.

The laser mirrors define the ends of the optically active gas volume. Laser mirrors are generally required to have very precise surface figures, typically perfect to within about 0.1 wavelength of visible light. Multiple dielectric coatings are typically provided on mirror surfaces, so as to provide very high reflectivity, generally 98.5% to 99.9% for helium-neon lasers, while permitting a small fraction of incident radiation to be transmitted with little loss. These dielectric coatings comprise a variety of materials such as silicon oxide, and titanium oxide. The technology of laser mirror production is widely known, and such mirrors are commercially available from many manufacturers, such as Spectra-Physics, of Mountain View, Calif. It is contemplated in the practice of this invention to utilize any suitable laser mirrors, with such parameters as reflectivity and radius of curvature to be determined by the nature of the laser gas and by the requirements of the specific laser use and application.

The laser mirrors must generally be precisely aligned with respect to one another and with respect to the axis of the laser bore. Typically, a perpendicular to the mirror surface at the laser bore axis must be aligned within a fraction of an arc minute of that axis. Techniques of mounting and aligning mirrors to this tolerance are well known in the art. Although there may be particular mirror mounting and alignment techniques which are unusually well-adapted to the class of laser constructions described herein, it will generally be possible to adapt to this present class of lasers any mounting or alignment technique that has been used with prior-art lasers.

The ends of the volume filled with laser gas may be terminated directly by the laser mirrors (the so-called "internal-mirror" laser), or may be terminated by vacuum-sealed optical windows, generally mounted at Brewster's angle, with the mirrors located outside the windows (the "external-mirror" laser). It is also possible to construct a laser in which one end is mirror-terminated and the other is window-terminated.

Although most of the examples given in this disclosure are stated in terms of just one of these three forms, it should be understood throughout that in almost every case any of the three would be a possible and potentially useful variant.

An important element of the construction of a gas laser tube is the method and materials used to seal or attach, to the glass or metal structure of the tube, the mirrors or Brewster windows which define the ends of the optically active discharge volume. This is typically done by means of epoxy resins. The critical requirements for the seal are:

1. It should be impervious to contaminating material such as water vapor from the outside environment;
2. It should be suitable to the processing environment, such as high temperature;
3. It should not emit a significant density of contaminating materials;
4. It should constitute a seal of adequate mchanical durability.

A material commonly used to attach laser mirrors is Varian Torr-Seal$^{TM}$ epoxy resin, which is applied as a thin bead around the edge of the part to be sealed. Other sealing methods and materials are known to those skilled in the art. Although certain of these methods may be particularly suitable to the class of lasers contemplated in this invention, most known mirror-sealing methods will be readily adaptable to work with these lasers.

The procedures used for manufacturing the laser device should be adequate to remove all significant impurities. These procedures typically include evacuation, possibly at an elevated temperature, and the operation of a series of cleaning gas discharges in repeated fillings of gas.

Where d.c. gas-discharge lasers are to be constructed, a cathode and an anode will be required.

Cold cathodes are typically constructed out of aluminum, magnesium, zirconium, or alloys thereof. The cathode must be prepared so as to retard sputtering. The production of a thin sputter-resistant oxide layer over the electrode may be accomplished by operating a discharge in oxygen between the cathode and an auxiliary anode as described, for example, in Section 7–3 of *Gas Laser Technology*, by Douglas C. Sinclair and W. Earl Bell (Holt, Rinehart and Winston, Inc., 1969) which is hereby incorporated by reference. Various other sorts of cold cathodes, such as the multicarbonate cathodes used in neon signs, can also be used. It is also possible to employ hot cathodes, in which thermionic emission from the cathode is a significant portion of its total emission. It is contemplated, in one embodiment of the invention herein, to operate conductive-coating cathodes of the type described as either discharge-heated or external-powersource-heated hot cathodes.

Cold cathode configurations are typically hollow. The hollow configuration is used because it tends to retard the ill effects of sputtering and resulting gas clean up, and because it produces a compact structure.

The anode may be of any suitable conductive material which can withstand the cleaning procedures normally used in high vacuum technology.

It is common practice, in the prior-art technology specific to helium-neon laser manufacture, to manufacture the laser cathode from a piece of aluminum tubing. There are several consequential costs in laser manufacture using such a cathode. First of all, commonly available aluminum tubing has been made by an extrusion process which leaves the surface layer fouled with materials such as lubricating oil. Steps are required to remove the impure surface. One example of a suitable procedure for removing the surface layer is machining of a fresh surface using water as a lubricant instead of cutting oil, as disclosed by U. Hochuli, et al., "Cold Cathodes for He-Ne Gas Lasers", IEEE J. Quantum Electronics QE-3, 612–614 (Nov. 1967), which is hereby incroporated by reference. Also, U.S. Pat. No. 3,614,642, which is incorporated by reference.

A second cost of using an aluminum tubular cathode is that somewhat cumbersome means must be provided to support mechanically the cathode and to connect it electrically to a power supply outside the laser envelope. For example, in U.S. Pat. No. 3,739,297, the electrical connection and mechanical support means include a pin which must be heat-sealed through a glass section, with spring clips, welded wires, and other connecting means providing electrical connections between the pin and the cathode.

Many of the tubular glass laser device shapes which are commonly made by manual flame working would be quite expensive or impossible to manufacture with conventional high-volume glass-working machinery. An example of such a shape is the common "side-arm" laser construction, in which cathode and anode are placed in extension tubes or bulbs joined at the side of the laser capillary. A sidearm laser construction of this common sort is illustrated in FIG. 1—1 of *Gas Laser Technology*, supra.

Even the co-axial shapes which are more readily assembled on high volume machinery (and which also have the advantage to users of being compact in construction) will tend to be somewhat costly because of the need to produce several vacuum-tight seals with relatively low strain and the requirement of assembling three, four or more tubular components with excellent coaxial alignment. Also the laser capillary tube must retain a high degree of straightness during all the heating and cooling operations which are implicit in manufacture.

In another known method of laser construction, a laser bore and channels connecting thereto are drilled into a block of fused quartz or other insulating material and separately-manufactured electrode envelopes are joined to the connecting channels. Such a laser is illustrated in H. G. van Bueren, et al, "A small and stable continuous gas laser", Physics Letters 2,340-341 (Nov. 1, 1962) which is hereby incorporated by reference. The expense of drilling holes in glass materials may be uneconomical, especially when the depth of each hole must be long in relation to its diameter. Likewise, large scale production may not be feasible.

Another method of laser envelope construction comprises the so-called "pressed" or "flat" glass laser as disclosed in our copending U.S. patent application Ser. No. 523,609 filed Nov. 13, 1974, hereby incorporated by reference.

The envelope of a gas laser is normally constructed out of glass such as a borosilicate, e.g., Kimble KG-33. However, many other glasses may be used so long as the thermal expansion coefficient is suitable for normal manufacturing procedures and so long as the glass material itself does not contribute undesirable amounts of impurities to the gas discharge.

Other materials, such as metals, plastics, ceramics, glass-ceramics, and so forth may also be utilized. Plastics and other materials having high vapor pressures have generally been used only in flowing-gas lasers, which tend to be less sensitive to impurities than are sealed-off lasers because the constant gas replenishment in a flowing-gas laser reduces impurity levels.

Throughout this disclosure frequent reference is made to the use of glass as the basic material. It is important to understand that the methods and device configurations described are in almost every case adaptable for use with machined or pressed ceramics, molded plastic, or any other insulating material, with appropriate alterations in choices of sealants, thermal processings, and the like. The nature of the necessary modifications will be apparent to those skilled in the art.

A common method of laser envelope construction has been the flame-working of tubular glass components. An example of such a laser is the "single bore tube gas laser" described in U.S. Pat. No. 3,739,297, hereby incorporated by reference. Tubular glass has the advantage of being a relatively inexpensive material, of being conveniently worked into a variety of configurations, and of being a relatively convenient material for the formation of gas-tight seals. One disadvantage of tubular glass structures is that such devices are more expensive than might be hoped when they are manufactured in large volume.

In accordance with the "pressed" glass embodiment, referred to above, there is provided a gaseous laser device comprising an envelope, a cathode, a lasing gaseous volume, and an anode, the envelope being defined by at least two opposing substrates bonded together, the cathode, lasing gaseous volume, and anode being positioned within different cavities of at least one substrate such that the cathode, lasing gaseous volume, and anode are commonly confined within the envelope in an integrally connecting relationship.

Most laser applications have involved the use of relatively small numbers of lasers. However, there have been recent advances in the art calling for relatively large numbers of lasers. One example of such an application is the video long-play record, or VLP, which is likely to require a low-power helium-neon laser attached to a large fraction of all television sets sold. Another such application is the laser-equipped point-of-sale scanner; which provides for automatic reading, by a scanned laser beam, of identifying tags on supermarket merchandise.

With these high-volume applications actually imminent, there comes to be a premium on the development of high-volume, low-cost long-lived lasers including manufacturing techniques.

It is widely believed that a major cause of failure in the gaseous lasers and decrease in effective life span is sputtering of the cathode material.

In accordance with the practice of this invention, such cathode sputtering is significantly reduced so as to extend the working life of the gaseous laser. More particularly, in accordance with this invention, the current density at the working surface of the cathode is decreased sufficiently so as to substantially retard the deleterious effects of sputtering and increase the laser life.

It is known in the prior art that a decreased current density will decrease cathode sputtering. See, for example, John P. Goldsborough, "Design of Gas Lasers", in F. T. Arechi and E. O. Schulz-Dubois, eds., *Laser Handbook, Vol. I*, North-Holland Publishing Co., 1972, at page 614. Goldsborough recommends a current density under 100 $\mu$A/cm$^2$ at 3 Torr, although other values have been used.

Furthermore, it has been found in a number of reported experiments that the rate of cathode material removal by sputtering in a glow discharge is proportional to a high power of current density. See, for example, pages 138–144 of G. F. Weston, *Cold Cathode Glow Discharge Tubes*, London ILIFFE Books Ltd, 1968, in which experiments are summarized showing sputtering rates proportional to the 2.5 or 3 power of current density. This text is hereby incorporated by reference.

In the practice of this invention, it has been discovered that the geometry of the cathode surface and/or cathode volume, and the geometry of the "cathode connecting volume" which connects the laser bore to the cathode volume, can be specifically designed so as to maintain the cathode current density at a level low enough to prevent excessive sputtering. Specific geometric designs are disclosed and defined hereinafter.

It is desirable, in order to hold cathode sputtering and gas cleanup to an acceptable level in helium-neon or other gas lasers, to keep the current density at the cathode surface relatively low, typically about 50 to 500 microamperes per square centimeter.

In the practice of this invention, we have discovered and disclose herein a variety of design features whose function is to maintain the current density, at every point on the cathode working surface, at a level low enough to prevent excessive sputtering.

In the specific practice of this invention, we have observed that if a given amount of current is to be distributed over a cathode of given surface area with maximal uniformity (so as to minimize the risk of rapid cathode erosion at points of high current density), then as much as possible of the surface area of the cathode should be close to the point of discharge entry.

To state this design criterion mathematically, the surface integral I should be minimized, where, given a certain total surface area $S = \oiint ds$, we define $$I = \oiint d\, ds$$

where $d$ is the distance from a surface element $ds$ to the point of discharge entry. The center-entry position illustrated in FIG. 5 clearly meets this criterion better than does the end-entry position of FIG. 1.

In setting forth our invention, it will be useful at times to describe the gas laser not in terms of the solid physical components which make it up, but rather in terms of the volumes of space, which may be occupied by gas, vacuum, or inserted objects, that are bounded by the surfaces of the physical components of the laser envelope. There are usually several connected constituent volumes in a gas laser, each of which has one or more well-defined functions. For example, a common d.c. glow discharge laser envelope, such as that depicted in FIG. 1—1 of *Gas Laser Technology*, may be thought of as having five constituent volumes; a cathode volume, whose function is to contain the cathode electrode and the portions of the glow discharge which attach to the cathode (e.g., the negative glow and the Faraday dark space), a cathode-connecting volume whose function is to conduct the discharge from the cathode volume to the laser bore, a laser bore (defined in this case by the inner surface of a piece of capillary tubing) whose function is to contain the positive column in which laser action occurs, an anode connecting volume, and an anode volume to contain the anode electrode and the discharge segments attached thereto (e.g., the anode fall if one is present).

Other types of gas lasers may have different constituent volumes, but in most cases it will be true that several recognizably different spatial volumes enter into the laser's construction, each of these volumes having particular operational functions.

It should be understood that by constituent volumes, we do not necessarily mean spaces all of whose boundaries are defined by solid walls. For example, in the device shown in FIG. 1—1 of *Gas Laser Technology*, supra, the cathode volume is open at the point where the cathode connecting tube joins the cathode bulb. Nevertheless, it is clear to one skilled in the art that the space enclosed by the cathode bulb (and closed by an imaginary plane across the end of that bulb where the connecting tube enters) is a recognizably separate region of the laser device, having well-defined functions. It is not always a matter of universal agreement how best to conceptually divide a given laser device into constituent volumes. For example, for some purposes it might be convenient to consider the cathode volume and the cathode-connecting volume as a single unit. Nevertheless, it will be understood by those skilled in the the art that most gas lasers have several recognizably-distinct constituent volumes.

Although most of the embodiments herein are stated in terms of positive-column glow-discharge, helium-neon lasers, which typically have cathode volumes, laser bore volumes, anode volumes, and one or more connecting volumes, many other varieties of lasers are contemplated to be within the scope of the invention, such lasers requiring other constituent volumes well known to those skilled in the art. For example, metal vapor lasers may include metal-storage and condensation volumes. Lasers unusually subject to gas cleanup may include as reservoir volumes. Lasers subject to serious cataphoretic effects may include return path volumes (analogous to that illustrated in the U.S. Pat. No. 3,628,176). Getter-containing volumes might be incorporated in many different varieties of gas lasers, in order to increase resistance to contamination during long-term operation, or to reduce the purity requirements placed on the gas-filling station used in laser manufacture. Coolant-flow volumes may be provided in lasers which require the removal of excess heat.

Volumes may be provided for the insertion of optical elements, such as prisms, Brewster windows, intensity or phase modulators, gratings, aperatures, lenses, detectors, etalons, beam splitters, or other mirrors additional to the two normally required in the operation of a laser.

When we refer to the envelope of a laser, we mean the gas-tight wall which defines the periphery of the constituent volumes of the laser. However, in some embodiments, the envelope is considered not to include the mirrors or windows which define the ends of the laser bore, these end terminations having to be bonded to the envelope to complete a truly gas-tight structure. Likewise, electrical feed-throughs which conduct electric current from the inside to the outside of the envelope are generally considered not to be a part of the envelope, but rather to be separate components which pass through the envelope in gas-tight fashion. In one embodiment of this invention, the envelope consists of at least two opposing electrically-insulating components which are sealed, fused, or otherwise bonded together to form a structure which, with the addition of sealed-on mirrors, becomes gas-tight.

In this invention, several basic structural embodiments, each of which is particularly suitable to high-volume manufacture, are contemplated. In one embodiment, one or more constituent volumes of the laser are incised, pressed, molded, machined, ground, etched, or otherwise defined in a single surface of a substrate. These volumes are then closed by sealing a second, flat, substrate to the incised substrate.

In a further embodiment, all or a plurality of constituent volumes of the laser are defined by the combination of depressions in the mating faces of two component substrates, neither of the mating surfaces being entirely flat. In this variation, it may be that neither of the substrates has any planar surface.

Another embodiment may be described as the "multiple-plate laser". Top and bottom surfaces of all or a plurality of this laser's constituent volumes are defined by essentially-planar surfaces of top and bottom plates. The side surfaces of these volumes are defined by one or a multiplicity of plates essentially of equal thickness, which are sealed between the top and bottom plates.

Many obvious improvements to these three approaches are possible, and more than one of them may be employed in a single device. Some of the possible variations will be suggested in this disclosure, and others will be apparent to those skilled in the art.

Reference is made to FIGS. 1 to 12 illustrating some of the best embodiments contemplated by the inventors in the practice of this invention.

In FIG. 1, there is illustrated an exploded, perspective view of a two-part, "pressed" or "flat" laser construction which may be used in the practice of this invention.

FIG. 5 is a plan view of a laser substrate having a length of tubing for insertion of the discharge into the cathode volume.

FIG. 6 is a cross section of the cathode region of a laser incorporating the substrate and insertion tube of FIG. 5.

FIG. 7 is a schematic side view of a segmented tubular cathode for a laser, with an offset plot of current density versus the distance of the discharge from its point of entrance into the cathode.

Figure 1:
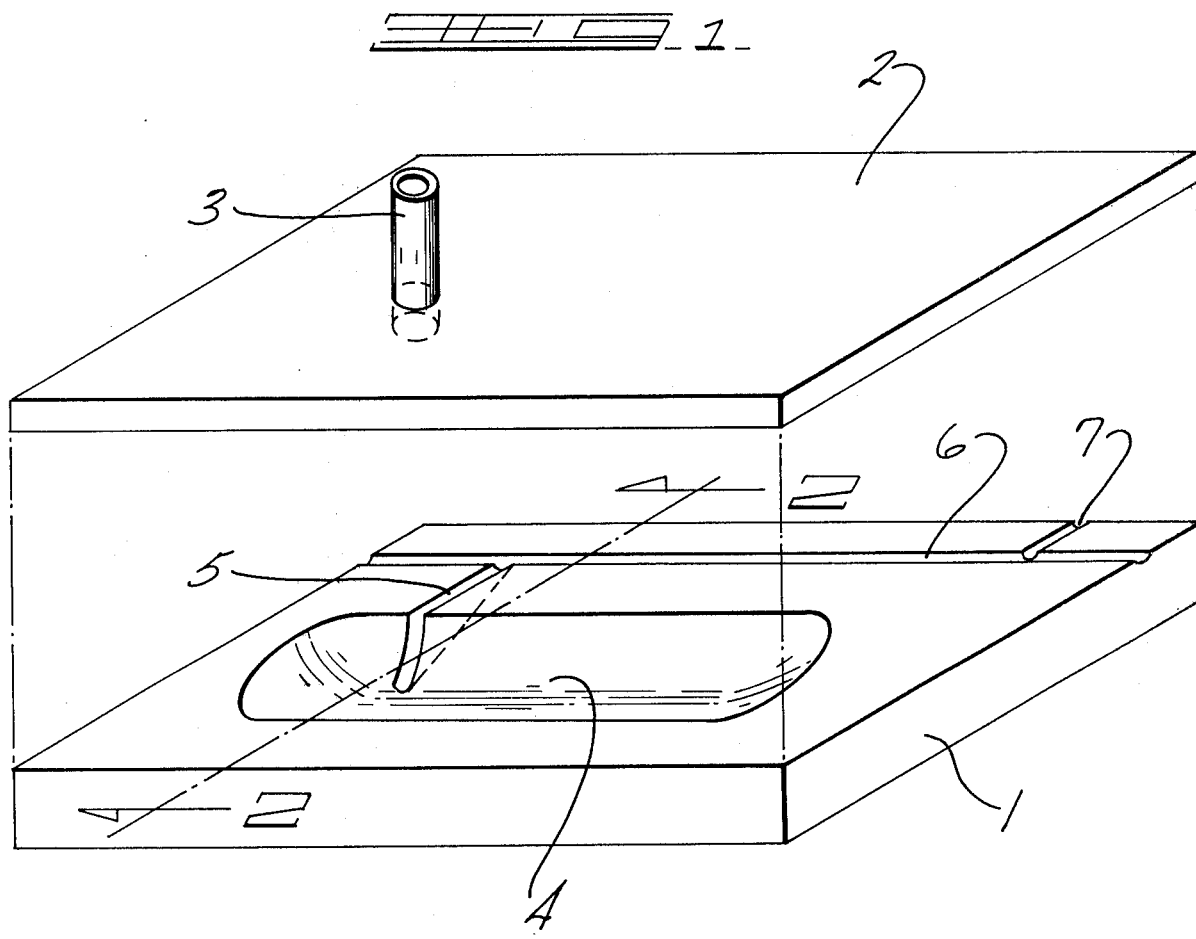

In FIG. 1, there is illustrated a substrate 1 and a cover plate 2. The cover plate 2 contains a gas processing tubulation 3. Substrate 1 contains a cathode volume 4, a connecting channel 5, a laser bore or groove 6, an anode channel 7.

Although the gas processing tubulation 3 is shown as connecting with the cathode volume 4, it will be understood by those skilled in the art that this gas processing tubulation may be conveniently positioned anywhere in the device so as to introduce gas into the cathode volume, connecting channel, and the laser bore.

Although not shown in FIG. 1, it will be understood by those skilled in the art that a cathode will be introduced into the cathode volume area 4. Likewise, an anode will be conveniently inserted and sealed, vacuumtight, into the anode channel 7.

Figure 2:
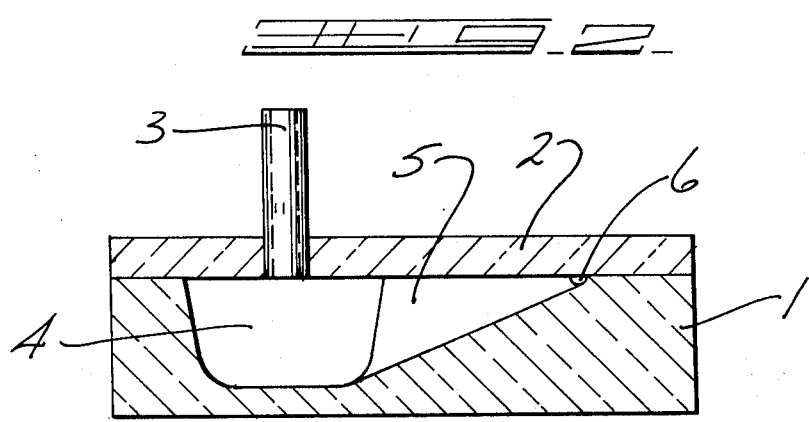
FIG. 2 is a cross-sectional view of FIG. 1.

In FIG. 2 there is illustrated a cross-sectional view of the entire assembled device of FIG. 1.

Figure 3:
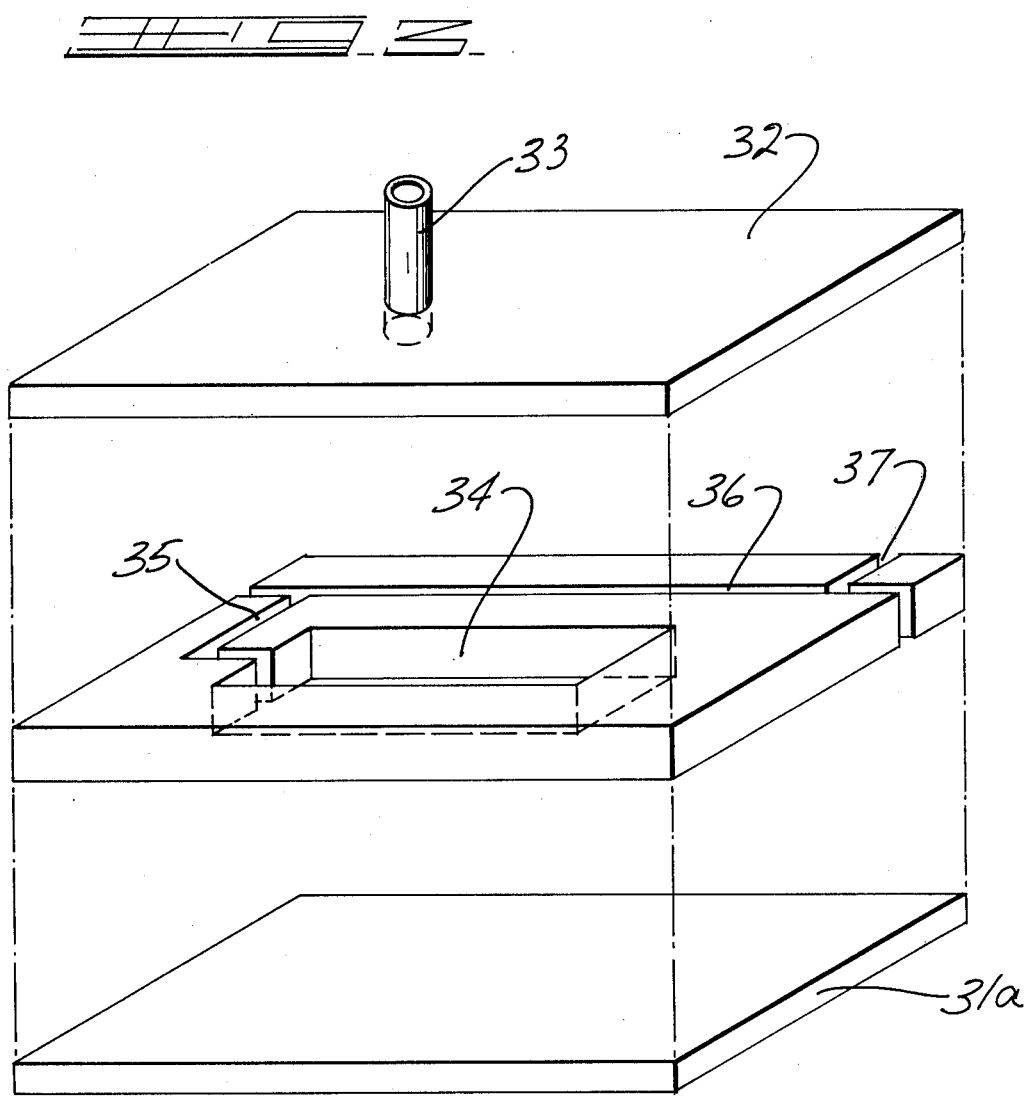
FIG. 3 is an exploded, perspective view of a threepart laser prepared in accordance with this invention.

In FIG. 3 there is illustrated a modification of the embodiment of FIG. 1. There is shown a top cover plate 32, a center plate 31, and a bottom cover plate 31a. The top cover plate 32 contains a gas processing tubulation 33. The center plate 31 may be made up of one or more segments. It comprises a cathode volume 34, a connecting channel 35, a laser bore 35, and an anode channel 37.

The cathodes and anodes are not illustrated in any of the FIGS. 1, 2 and 3. However, it will be clearly understood by those skilled in the art that cathodes and anodes of various geometric shapes may be conveniently inserted into these devices. For example, a cathode would be inserted into the cathode volume 34 in FIG. 3 and an anode would be inserted into the anode channel 37 in FIG. 4. In actual practice, the cathode typically may be in the shape of the walls of the cathode volume 34.

Figure 4:
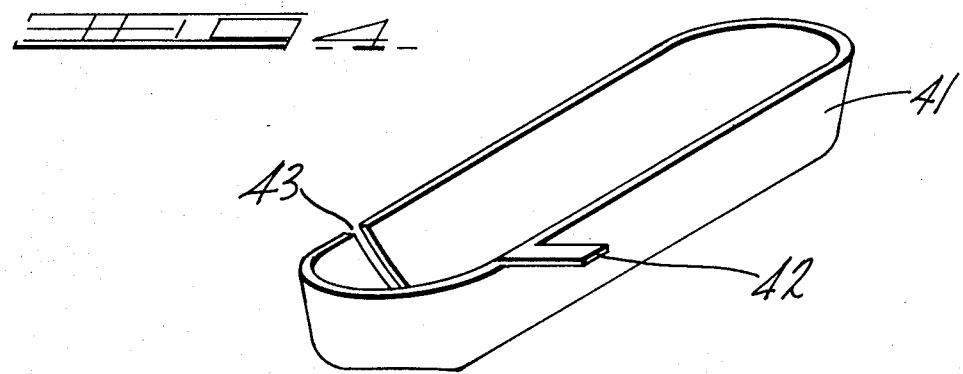
FIG. 4 is a perspective view of a cathode structure embodiment.

In FIG. 4 there is illlustrated a cathode body 41 which would generally conform to the wall shape of the cathode volume 4 in FIG. 1. The cathode 41 contains a metal spade 42 which acts as a contacting tab for connection to an outside source of electrical power. There is also illustrated an entrance hole 43 opening into a connecting channel such as illustrated in FIGS. 1, 2 and 3.

One advantage of the set of geometries contemplated in one practice of this invention is that the internal surfaces of the constituent volumes of the laser are all laid open, which facilitates cleaning during manufacture, using a variety of cleaning processes such as plasma cleaning.

Another advantage of the laying-open of internal surfaces inherent in this practice of the invention is that it facilitates coating by a variety of processes, such as vacuum evaporation, sputtering, chemical vapor deposition, ion plating, and settling from solution.

One useful application of coatings in the manufacture of laser cathodes by placing an adherent coating of conductive material on the walls of the cathode volume of the laser device. An anode electrode may be similarly manufactured.

It should, of course, be understood that the laser envelopes of this invention may be so constructed as to accept conventional electrodes, such as a metal pin anode or a hollow-tube cathode. A cathode of this general type is illustrated in FIG. 4. It is one important feature of this invention, however, that the laser envelopes described may easily be constructed so as to accept coated electrodes, a feature not shared by conventional tubular glass laser envelopes. To produce the cathode and anode electrodes, for example, a vacuum evaporation system may be used to coat the upper and lower laser substrates, through a mask, with several hundred A of chrome (to act as an adhesion laser), followed by approximately 10,000 A of aluminum. The mask restricts deposition to the regions which upon closure of the device would be the cathode and anode volumes.

Any suitable metal or metalloid or semiconductor can be utilized as the cathode or anode material including the pure forms and conductive alloys of Mg, Be, Ti, Zr, Hf, V, Nb, Ta, Cr, Mo, W, Mn, Tc, Re, Fe, Os, Rh, Ir, Ni, Pd, Pt, Cu, Ag, Au, Zn, Cd, Hg, Al, Ga, In, Si, Ge, Sn, Pb, and so forth. Preferred materials include the pure or alloy forms of Al, Ti, Be, Mg, Ni, Ta, and Zr. For successful utilization of a particular material, it may be necessary to protect the working surface with an appropriate barrier coating such as an oxide, nitride, etc. Suitable barrier coatings include oxides or nitrides of Mg, Al, Si, Zr, Ti, Ta, and the rare earths.

It should also be noted that "thick-film" coatings may readily be applied to the surfaces of laser components prepared in accordance with the pressed glass and multiple-plate embodiments of this invention. These are typically coatings of conductive or insulating material which are applied in slurry form, by such processes as screen printing, settling, or spraying, and then heat-processed to remove solvents and solidify the material. Thick-film coatings have previously been employed in gas lasers. See, for example, K. G. Hernquist, "Low-radiation-noise He-Ne Laser", RCA Review, September 1969, pp. 429ff. hereby incorporated by reference, in which a porous alumina lining, saturated with potassium, is used to form a conductive cathode surface.

The unique feature of a thick-film coating, as used in a pressed or flat device, is that the openness and accessibility of the structure would make the application of coatings especially straightforward and economical.

An advantage of the open, easily coated structures is that passivating coatings may be easily applied to all interior surfaces. For example, it would be possible to evaporate several thousand A of alumina or silica onto all interior surfaces of the device shown in FIG. 1 prior to the application of metal layers, so as to prevent diffusion of impurities harmful to laser action out of the glass substrates. Suitable protecting materials include the oxides, nitrides, or carbides of B, Mg, Al, Si, Zr, Ti, Ta, and the rare earths.

The use of interior coatings on laser bores has been disclosed in the prior art, for example in U.S. Pat. No. 3,394,320 to G. K. Medicus. What has not been disclosed is the application of such coatings by methods such as electronbeam evaporation, which requires a clear line of sight from a source, or the application of a passivating coating to all or some interior surfaces of a laser for the purpose of preventing emission of harmful impurities from those surfaces.

The use of such passivating layers makes it possible to consider using materials such as injection-moldable plastics to fabricate lasers, even though the relatively high vapor pressures of such materials might make them unsuitable for use without such passivating layers except in particular types of lasers such as flowing-gas lasers. If a passivating layer is constructed (perhaps in several sub-layers, including two or more different materials) to have adequately low porosity under all conditions which the laser will experience, then the substrate material will not in any way interact with the gas discharge, and any substrate material may be used whose thermal, mechanical, and electrical-insulating properties are found suitable. In fact, the substrate material might be a conductor, such as invar or aluminum, so long as adequate protective insulating layers were provided at all points to avoid the shorting-out of the gas discharge by the substrate material. An aluminum substrate heavily anodized on all surfaces might thus be suitable.

Two particular advantages of using an organic thermoplastic material to make laser envelopes are that:

1. Final alignment of the laser mirrors might be achieved by heating the plastic until it softened slightly, deforming the entire device or a part of it to obtain mirror alignment, and then permitting the plastic material to cool. A comparable method of alignment has been used with glass laser envelopes, but the high softening temperature of glasses makes this approach difficult with glass.

2. The several components of a thermoplastic laser envelope could conveniently be heat-welded to produce gas-tight bonds, thus eliminating the need for a separate sealant material.

Another example of the use of interior coatings in a pressed laser envelope is the production of conductive inserts in the laser bore to increase laser power. See, for example, Yu. G. Zakharenko and V. E. Privalov, "Oscillations in the discharge gap of He—Ne laser and their effect on the emission parameters", Opt. Spectrosc. 35, 434 ff (October 1973), hereby incorporated by reference. Zakharenko and Privalov demonstrate that the use of metal rings, spaced within the positive column of a He-Ne laser, can increase output power. The open structure makes it very economical and straightforward to provide such inserts, either by coating the walls of the bore or by dropping in separate metal tubes before sealing on the top plate. If it is desired to provide electrical contact to these rings, external connections could be manufactured by techniques such as those disclosed hereinbefore for anode and cathode connections.

Yet another possible example of the utility of interior coatings arises in the manufacture of high-current rare gas ion lasers. A common difficulty in the manufacture of such lasers is that the laser bore is rapidly eroded by the arc discharge. See, for example, William Bridges, "Materials and Techniques for Gas Lasers," Proc. 9th IEEE Conf. on Tube Techniques, 1968, pp. 117 ff, incorporated herein by reference. If the bore of such a laser is laid open, in a flat or pressed construction, it could be straightforward to apply a very durable internal coating by a process such as flame spraying or plasma spraying. The substrates to be coated could be selected for such properties as high thermal conductivity, while the coating could be selected simply on the basis of its providing maximal resistance to erosion by the arc.

Another advantage of the class of pressed or flat laser envelopes contemplated in one practice of this invention is that the flexibility and precision of laser bore manufacture can be considerably enhanced. For example, in the conventional tubular gaseous laser, in which the laser bore is a section of capillary tubing, it becomes relatively expensive to make bores much smaller than 0.040 inch in diameter, or more precisely controlled in diameter than ± 0.010 inch because of the difficulties involved in accurate control of the drawing process. In contrast, if the bore is manufactured by machining the surface of a glass plate, for example with a tungsten carbide or diamond grinding wheel of thickness slightly less than the desired bore width, it becomes straightforward to make bores at least a factor of two smaller than 0.040 inch in greatest dimension, and to control bore dimension to ± 0.001 inch or better.

One particular application of this advantage will lie in the manufacture of unusually short helium-neon lasers or relatively high power. Since the gain of these lasers is known to be inversely related to diameter, the availability of smaller diameters will make it possible to approximately match the output powers of contemporary devices, but with a laser of shorter length.

A second application of the advantage will lie in precise control of transverse lasing modes. It is common practice to restrict lasers to desired modes of operation, e.g. $TEM_{00}$, by controlling the size of the optically limiting aperture in the laser cavity. In many cases, the aperture is the bore itself. The availability of economical methods for precise control of bore diameter will make more economical the precise control of transverse laser modes.

The necessity of the embodiments described herein for reducing cathode current density became evident during experimentation with a laser made according to FIG. 1. In one embodiment hereof, the cathode-connecting channel 5 of the device in FIG. 1 has a width and depth of approximately 0.15 inch at the cathode end. The cathode is of evaporated aluminum. When the device was operated for a period of hours, the cathode metallization was observed to erode seriously near the point where the connecting tube 5 entered cathode volume 4. Observations of the relative brightness of the discharge as a function of position in the cathode volume made it apparent that current density was highest near the entry point of the discharge.

The device illustrated in FIGS. 5 and 6 represents one embodiment of this invention utilized to reduce cathode current density to a level low enough to prevent serious cathode erosion.

There is illustrated in FIG. 5 a laser substrate 51, in which are several connected depressions: a cathode volume 54, a cathode-connecting volume 55 comprised of connecting segments 55a and 55b, a laser bore 56, and an anode volume 57. Enlarged end sections 60 are shown on the laser bore 56, these enlarged end sections providing for reduced diffraction loss and for easier alignment of the laser mirrors (not shown) when they are added to the device. The anode volume 57 is simply a small side projection on the laser bore. It is intended that the anode to be used with this particular device would be a thin foil 61 to be sealed vacuum tight between substrate 51 and a cover plate 52 (shown in FIG. 6). The enlarged space 57 permits adequate electrical contact between the anode 61 and the gas discharge, without any necessity for the anode to protrude into laser bore 56 (which protrusion could interfere with proper optical performance of the laser).

A glass insertion tube 58, which may have a flared end section 59, is sealed into the straight section 55b of the connecting channel 55, so as to conduct the gas discharge out into the heart of the cathode volume.

As can be seen in the cross-sectional view, FIG. 6, insertion tube 58 may be bent, so as to release the discharge into the cathde volume at some distance from the top wall of the cathode volume. It may also be seen in FIG. 6 that the top wall is formed by bonding a cover plate 52, similar to cover plate 2 in FIG. 1, to substrate 51.

Although a particular anode, anode volume, and cathode volume have been illustrated in FIGS. 5 and 6, it will be obvious to those in the art that other designs of these components may be used in combination with insertion tube 58 which is the essential component of this embodiment.

In the operation of the device of FIGS. 5 and 6, the gas discharge spreads out as it travels from laser bore 56 through the tapered connecting channel 55a. This channel 55a may alternatively be untapered. It then enters the cathode cavity through tube 58. The gas discharge emerges from the end 59 of tube 58 (which may be flared to aid the spreading of the discharge) and must travel some distance through the cathode volume before it strikes a metal surface, which in this example is a conductive coating on the inside walls of volume 54. This distance of travel permits the discharge current to spread considerably before it strikes the metallization. The resulting low current density is such that serious cathode erosion is no longer observed, even after more than 1800 hours of operation. Typical dimensions of one best embodiment of a successful device of the FIG. 5 type are as follows:

| | |
|---|---|
| Cathode depth: | about 0.7 inch |
| Cathode width: | about 2 inch |
| Cathode length: | about 6 inch |
| Depth and width of channel 55a: | .060" at small end |

| | |
|---|---|
| Length of channel 55a: | about 0.25" at large end<br>2" |
| Depth and width of channel 55b: | about 0.25" |
| Length of channel 55b: | about 0.5" |
| Length of tube 58: | about 1.5" |
| Diameter of tube 58: | about .25" outside<br>about .15" inside |

An important feature of the successful assembly of a device according to FIG. 5 is that the sealing of tube 58 into channel section 55b must be sufficiently tight so as to prevent the gas discharge from establishing a "sneak path" between the outer wall of tube 58 and the wall of section 55b; otherwise, the discharge could flow from cathode volume 54 to connecting channel 55a without going through tube 58 at all. In the absence of such a seal, cathode erosion may occur around the location where tube 58 enters cathode volume 54. A suitable seal might be achieved by means of a heat-processed sealant such as solder glass, by means of a chemical bonding agent such as epoxy resin, by direct thermal fusion of tube 58 to channel 55b, or by any other suitable bonding means. It is also possible to achieve adequate resistance to a sneak-path discharge by manufacturing tube 58 to fit its confining walls very closely, for example within 0.002 inch or better. In such an embodiment, no sealant is required, so long as adequate means is provided to hold tube 58 in its proper position.

An important feature of the device illustrated in FIGS. 5 and 6 is that the side walls 62 of cathode volume 54 are sloped at about 45°. As a result of the slope, an evaporated conductive coating applied to the walls of the cathode cavity will be about 0.707 times as thick on the sidewalls as on the bottom 63 of the cavity. In contrast, the sidewalls of the cathode cavity shown in FIGS. 1 and 2 are in some locations within a few degrees of being vertical. Unless special evaporation fixtures are used, it is difficult to coat the near-vertical side walls of cathode volume 4 in FIG. 1 to more than one-eighth of the thickness of a coating on the bottom of the cathode volume.

The 45° slope thus makes it possible to coat all of interior surfaces to a thickness adequate to provide sufficient conductivity and resistance to erosion by the discharge, without requiring the processing time to coat some of the interior surfaces to an unnecessarily great thickness.

Another important feature of the device shown in FIGS. 5 and 6 is that the discharge is brought into the cavity at a point near the cavity's center along its longest dimension. This is in contrast to the conventional point of entry into an elongated laser cathode, i.e. at one end of the cathode, as illustrated in FIG. 3, and also in FIG. 1—1 of *Gas Laser Technology, Supra.*

This side-entry design illustrated by FIG. 5 is one which would be comparatively more expensive to manufacture than the normal end-entry design, if conventional tubular laser technology were being used. However, with the integrated-manufacture techniques described in one embodiment of this invention, it is straightforward and inexpensive to enter at the center of one side of the cathode.

The virtue of center entry may be understood by referring to FIG. 7. This figure is taken from a translated document prepared by the Foreign Technology Division of the Air Force Systems Command. The document is available from the National Technical Information Service as AD 771885. The citation of the Russian original is O. A. Boyarchikov and A. S. Shipalov, "Investigation of current distribution on the surface of a hollow cathode in a glow discharge in a mixture of helium and neon gas," Trudy Moskovskovo Energeticheskovo Instituta: Radioelektronika, Nr. 108, 1972, pp 89–91. This is hereby incorporated by reference.

FIG. 7 shows schematically a segmented hollow cathode 70 (comprised of multiple segments 71) for use with a helium-neon gas discharge, each of which segments 71 can be separately connected to an ammeter. The data taken with the ammeter are represented in the graph plotted at the bottom of FIG. 7. The graph shows that current density drops off rapidly with distance from the point (in this case the far right-hand end of FIG. 7) at which the discharge enters the cathode.

In FIGS. 8, 9, 10 and 11, there is illustrated a laser which achieves the purpose of keeping cathode current density to an acceptably low level, by a different method than that employed in the device of FIGS. 5 and 6. The tapered connecting tube 85, which is an essential feature of the embodiment of FIGS. 8 to 11, can be seen to be economical to manufacture primarily because of the innovative techniques of manufacture contemplated in this invention.

Figure 8:
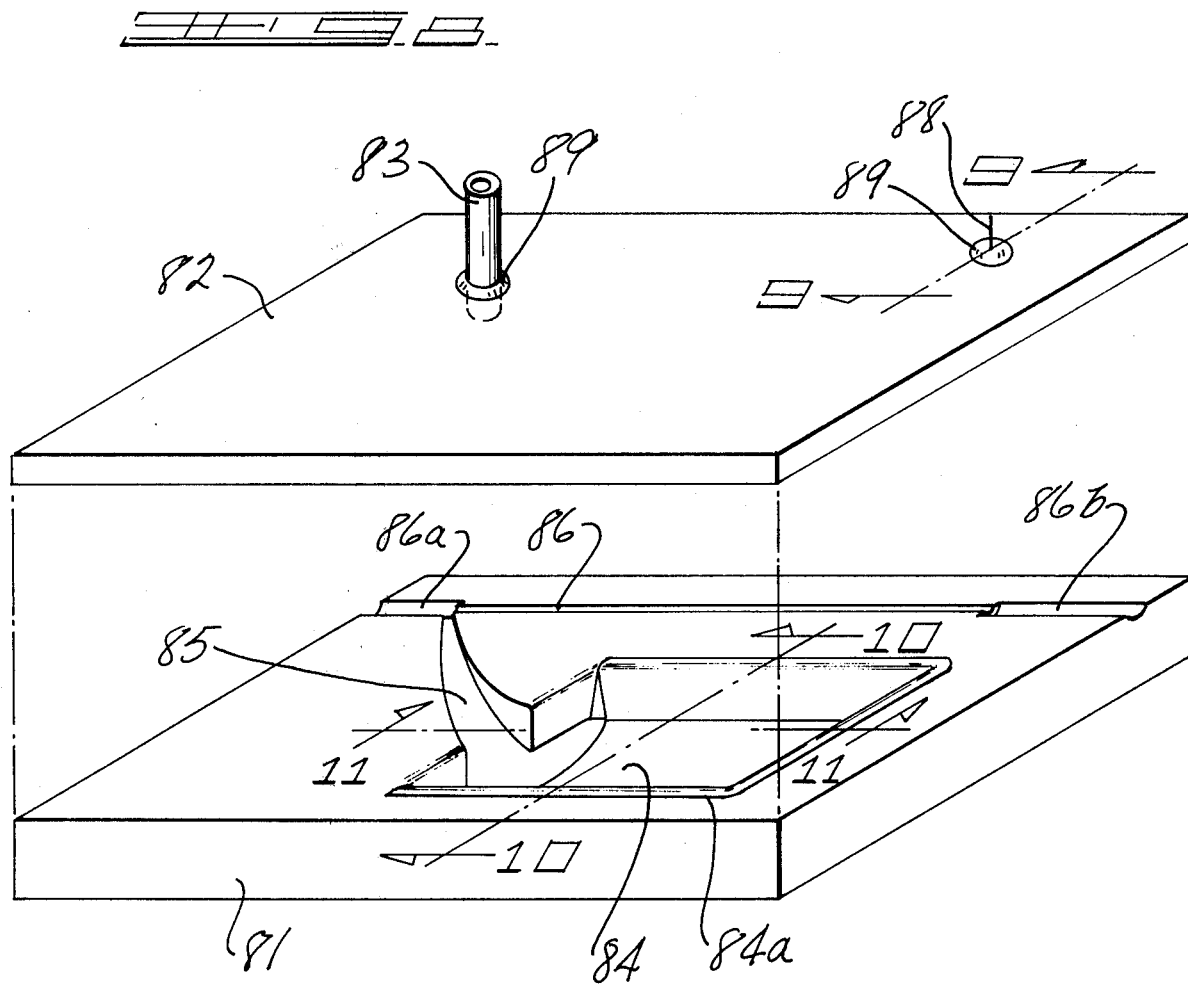
FIG. 8 is an exploded view of a laser envelope. It is similar to FIG. 1 and incorporates the tapering connecting channel as required by one embodiment of this invention.
Figure 9:
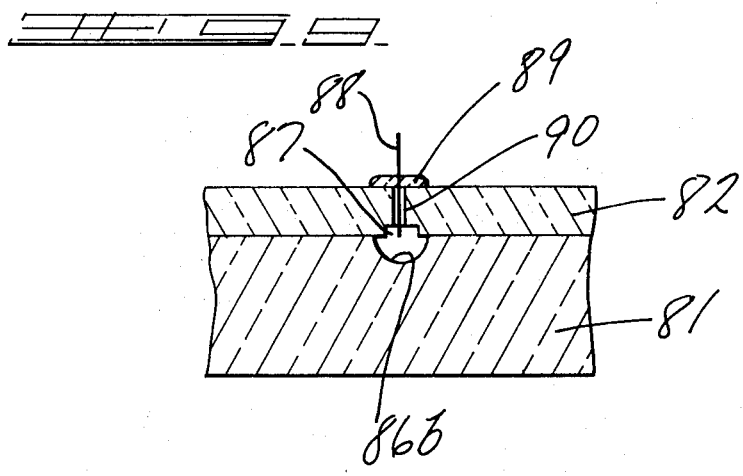
FIG. 9 is a cross-sectional view of the anode region of the FIG. 8 device.
Figure 10:
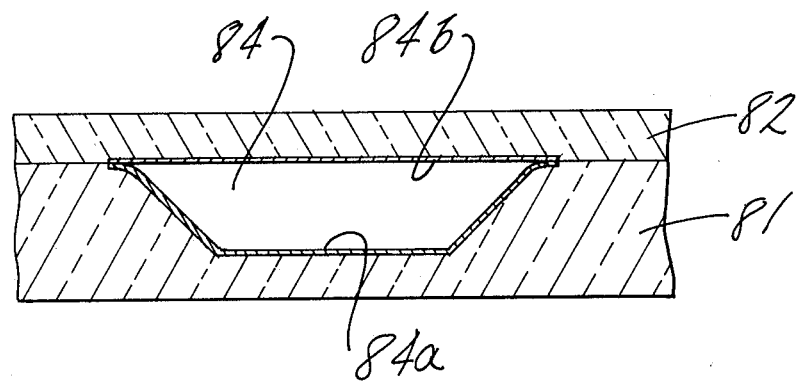
FIG. 10 is a cross-sectional view of the cathode reigon of the FIG. 8 device.
Figure 11:
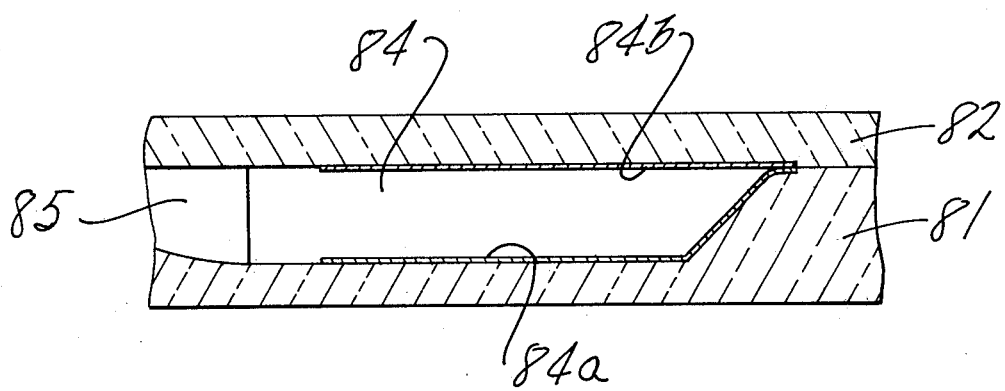
FIG. 11 is a different cross-sectional view of the cathode region of the FIG. 8 device.

In FIG. 8, there is illustrated a substrate 81 with a cover plate 82. The cover plate contains a gas processing tubulation 83, and an anode pin 88. Tubulation 83 and anode pin 88 are sealed vacuum-tight through cover plate 82 by means of solder glass beads 89. Substrate 81 contains a cathode volume 84 having a conductive coating 84a over a portion of its surface. An alternative embodiment could easily use a preformed insert cathode, such as that illustrated in FIG. 4. That portion of cover plate 82 which overlies and completes the boundary of volume 84 may optionally have a conductive coating 84b (as illustrated in FIG. 11). It is understood that means are to be provided to electrically connect coatings 84a and 84b to the negative terminal of a power supply. It is essential that the least dimension of volume 84 (i.e. the smallest of length, width, and depth) be great enough to avoid undue concentration of current in the vicinity of the discharge entrance. For common helium-neon lasers, this dimension should be at least about 1 cm.

Substrate 81 also contains a connecting channel 85, having the characteristic that it tapers in both depth and width so that at its end proximate the cathode volume 84, its depth and width are comparable to the depth of cathode volume 84. This may be on the order of 2 centimeters (cm). At its opposite end the connecting channel has depth and width substantially smaller, for example, between 1mm and 1 cm. Although the cross section of channel 85 is shown to be substantially rectangular, it may have any other convenient cross-section, such as trapezoidal or semicircular, so long as the ratio of depth to width is in the range between about 0.5 and about 2 at the channel's larger end. Considerably more difference between depth and width is permissible at the smaller end of channel 85.

The limitation of the ratio of depth to width at the larger end of the channel has been found helpful in avoiding noise in the laser output. If the ratio of larger dimension to smaller dimension is permitted to become excessive, it has been found that the discharge will often contract to a diameter comparable to the smaller dimension, and that the position of the discharge within the channel may then become unstable. The physical motion of the discharge within the channel then leads to laser noise. On the other hand, by keeping the ratio of width to depth within the stated range, it has been found possible to ensure that the discharge spreads smoothly to fill nearly the entire cross section of the channel, and that therefore no positional instability is possible.

The length of channel 85 must be great enough to permit the discharge to spread smoothly from a small diameter at one end of channel 85 (proximate bore 86) to a larger diameter at the opposite end (proximate cathode volume 84). A typical length of channel 85 may be about 1 to 10 cm, with a particularly preferred length being about 5 to 8 cm.

It will, in general, be desirable to keep channel 85 as short as possible, consistent with the requirement of smooth spreading of the discharge, since a shorter channel will tend to reduce the required starting and operating voltages of the laser.

The innovative manufacturing processes contemplated in this invention are clearly such as to permit many variations in the geometry of channel 85. For example, although in FIGS. 8 and 11, the bottom of channel 85, at its end proximate cathode volume 84, is shown to be level with the bottom of channel 84, it is permissible for there to be a small difference in these levels, so that a step would occur of perhaps 1–2mm in passing from one to the other.

Although in FIG. 8 the path of channel 84 is shown to be a simple curve, it would also be permissible to have more complex paths, so long as the cross section of the channel monotonically increases from one end to the other.

A further variation is an increase of the cross section of channel 85 in a series of steps. The criterion of the maximum permissible step size is that it must be small enough to cause no significant instability in the discharge, since instabilities are in general a source of noise in the laser output. The exact permissible step size will vary with gas mixture and pressure, although with common helium-neon lasers it may be assumed to be less than about one centimeter.

Although FIG. 8 shows the tapered channel 85 entering cathode volume 84 at one end, other configurations are obviously possible. In one particularly desirable embodiment, the tapered channel enters approximately at the center of the long side of a generally rectangular cathode volume, the entry position being similar to that shown in FIG. 5.

An important feature of the device illustrated in FIGS. 8, 9, 10 and 11 is that those walls of the cathode volume 84 which are to be metallized are tilted as far from the vertical as considerations of space make practical. The unmetallized end wall of volume 84 is within a few degrees of vertical.

The edge of the metallization 84a, proximate the discharge entry, is generally curved concavely with respect to the discharge entry, so that as the discharge emerges from tapered channel 85 it can tend to spread out to fill the cross-section of volume 84 before striking the edge of the metallization. This design feature tends to reduce the density of current striking the metallization, thus prolonging device life.

Substrate 81 also contains laser bore 86, having enlarged end sections 86a and 86b, the enlargement of these end sections providing for reduced diffraction loss and for greater ease of alignment of the mirrors (not shown). It will be understood that these mirrors are added for completion of the device.

With respect to anode volume 87 in this particular device, the anode volume is an indentation in cover plate 82, which may be provided, for example, by grinding or pressing. Anode pin 88 projects into volume 87, the space around the pin in volume 87 being sufficient for the discharge to have good electrical contact with pin 88, with no substantially adverse voltage drops or instabilities.

It is important to the optical performance of the laser, that unless anode pin 88 is specifically intended to have a role in transverse mode selection, it does not protrude significantly into the cross-section of laser bore 86, or at least that it does not protrude into that part of the cross-section in which substantial laser oscillation is occurring.

Figure 12:
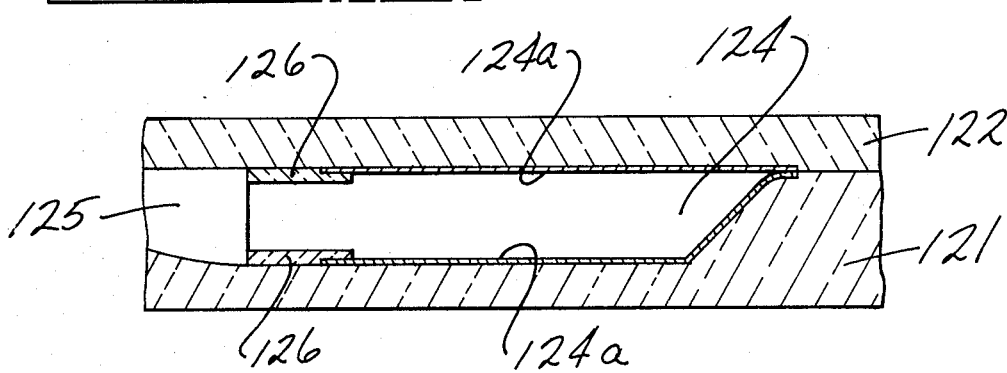
FIG. 12 is a cross-sectional view of a modified cathode region similar to that illustrated in FIG. 11.

FIG. 12 illustrates another important technique for protection of cathodes from excessive current density. FIG. 12 is a cross-section, similar to FIG. 11, of the cathode region of a device similar to that of FIG. 8. There are illustrated substrate 121 and cover plate 122 forming the boundaries of cathode volume 124 and connecting channel 125. Conductive coatings 124a, whose thickness is exaggerated for clarity, are applied to the walls of volume 124, and constitute the cathode.

It is well known in the art of manufacturing conventional sheet-metal laser cathodes that the edges of such cathodes tend to be particularly vulnerable to erosion, because they are points of field concentration. Various stratagems are known for the protection of these edges. FIG. 12 illustrates an innovative and elegant approach to edge protection, which is particularly suitable for use with the innovative manufacturing methods described herein. The figure shows an insulating layer 126, which may be any sputter-resistant material, such as silica, magnesia, alumina or ytterbia, (or the barrier or protective coatings listed hereinbefore) which is applied to the edges of metallization 124a before cover plate 122 and substrate 121 are assembled. The same wide variety of coating techniques is available for producing layer 126 as for producing the cathode itself, layer 124a.

In particular, layer 126 may be deposited by so-called "thin-film" techniques, such as sputtering or evaporation, or it may be deposited by "thick-film" techniques, as would be the case if layer 126 were produced by the screen-printing of a layer of solder-glass and heat-processing it to produce a continuous insulating layer.

Alternatively, 126 may represent a solid preformed insert of insulating material, which is placed in position during device assembly, and retained in position by the geometric design of cavity 124, by suitable adhesives, or by suitable mechanical clips.

Another technique for protection of cathode edges is illustrated in FIGS. 8, 10, 11, and 12. The metallizations 84a, 84b, and 124a are carried up over the edges of the cathode cavities 84 and 124, so that much of the perimeter of the metallization is sealed between the laser substrates, and therefore cannot be touched by the gas discharge. The cavity edges over which the metallizations pass are assumed to be suitably rounded, so that electrical conductivity is maintained across the edge, and so that the edge does not become a locus of intensified current.

Yet another protection technique, which is particularly advantageous when practiced with the pressed-glass laser embodiment, is to reduce cathode current density by eliminating the usually-employed hollow cathode configuration. This technique may be practiced, for example, by constructing a laser according to FIGS. 8, 9, 10, and 11, but eliminating either the upper metallization 84b or the lower metallization 84a. The cathode volume would be correspondingly enlarged, so that the total metallized area, and hence the average current density, would be unchanged.

The advantage of this technique may be understood by reference to FIG. 7. It may be seen in FIG. 7 that in a conventional hollow cylindrical cathode the current tends to concentrate near the discharge entrance. In particular, the current density near the entrance may be expected to be higher than the so-called "normal" current density, $j_n$, which would be observed with an essentially-infinite planar cathode. This is the well-known "hollow-cathode effect". See, for example, Weston, supra., pp. 107–113. By switching to an essentially-planar cathode we may eliminate this current-concentrating effect and enhance the uniformity of distribution of current.

In conventional tubular lasers, it would be cumbersome to provide an essentially-planar cathode with sufficient surface area, and with suitable protection to prevent any of the edges of the cathode from becoming points of current concentration. The edge-protection schemes illustrated in FIGS. 8 through 12 make it very straightforward and economical to protect the cathode edges, so that the combination of a pressed-glass envelope with an essentially planar cathode is uniquely suitable for maintaining cathode current density at a uniformly low level.

It must be understood that the advantage gained by eliminating the hollow-cathode effect will to some extent be offset by the loss of one well-known anti-sputtering effect of hollow cathodes, which is that such material as does sputter from the surface of a hollow cathode may easily be redeposited elsewhere on the surface of the cathode. There may still, therefore, be particular combinations of current, pressure, and gas filling, at which the hollow cathode can be shown to present a net advantage in reducing sputtering.

We claim:

1. In a gaseous laser device comprising an electrically non-conductive envelope, a cathode volume, a cathode within said cathode volume, a lasing gaseous medium contained within a laser bore which is separated from said cathode volume, an anode, means for igniting a gaseous discharge between the anode and the cathode, and lasing end pieces bounding said lasing gaseous medium, the improvement wherein there is a cathode connecting channel connecting said laser bore to said cathode volume, said channel being non-collinear with said laser bore and having a monotonically increasing cross-section provided at the gaseous discharge entry into said cathode volume, the direction of the monotonic increase being such that the cross-section of the gaseous discharge increases as it approaches the cathode.

2. The laser device of claim 1 wherein said connecting channel increases in cross-section in one or more steps.

3. The laser device of claim 1 wherein the cathode has a generally elongated geometric configuration and wherein the location of the discharge entry is approximately at the center of an elongated side of the cathode.

4. The laser device of claim 1 wherein a cross-section of the connecting channel transverse to the gas discharge current flow is a geometric configuration selected from the group consisting of trapezoid, triangle, square, rectangle, arc of circle, and arc of ellipse.

5. The laser device of claim 1 wherein the connecting channel monotonically increases in both depth and width.

6. The laser device of claim 1 wherein the depth and width of the connecting channel at the cathode volume end of the channel are each within a range of about 50% to 200% of the depth of the cathode volume near the place of gas discharge entry into the cathode volume.

7. The laser device of claim 1 wherein the ratio of depth to width of the connecting channel at the cathode volume end of the connecting channel, ranges from about 0.5 to about 2.

8. The laser device of claim 1 wherein the geometric configuration of the connecting channel is such as to permit the discharge to spread smoothly from a small cross-section at one end of said connecting channel to a larger cross-section at the opposite end of said connecting channel with no substantial gas discharge instability.

* * * * *